(12) United States Patent
Pitt et al.

(10) Patent No.: US 9,208,346 B2
(45) Date of Patent: Dec. 8, 2015

(54) PERSONA-NOTITIA INTELLECTION CODIFIER

(71) Applicant: TeleCommunication Systems, Inc., Annapolis, MD (US)

(72) Inventors: Lance Douglas Pitt, Kent, WA (US); Gordon John Hines, Kirkland, WA (US); John Griffin, Boston, MA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 96 days.

(21) Appl. No.: 14/018,756

(22) Filed: Sep. 5, 2013

(65) Prior Publication Data
US 2014/0068782 A1 Mar. 6, 2014

Related U.S. Application Data

(60) Provisional application No. 61/696,982, filed on Sep. 5, 2012, provisional application No. 61/696,986, filed on Sep. 5, 2012, provisional application No. 61/696,993, filed on Sep. 5, 2012, provisional application No. 61/868,311, filed on Aug. 21, 2013.

(51) Int. Cl.
*H04L 9/32* (2006.01)
*H04L 9/00* (2006.01)
*G06F 21/62* (2013.01)

(52) U.S. Cl.
CPC .................... *G06F 21/6254* (2013.01)

(58) Field of Classification Search
CPC . H04L 63/08; H04L 63/0869; H04L 63/0876; G06F 21/31; G06F 21/44; G06F 21/6254
USPC .................. 713/168–170, 189, 193; 726/2–7, 726/27–30
See application file for complete search history.

(56) References Cited

U.S. PATENT DOCUMENTS

| | | | |
|---|---|---|---|
| 1,103,073 | A | 7/1914 | O'Connell |
| 4,445,118 | A | 4/1984 | Taylor |

(Continued)

FOREIGN PATENT DOCUMENTS

| | | |
|---|---|---|
| KR | WO/2006/075856 | 7/2006 |
| SE | WO9921380 | 4/1999 |

(Continued)

OTHER PUBLICATIONS

Intrado Inc., Qwest Detailed SR/ALI to MPC/GMLC Interface Specification for TCP/IP Implemenation of TIA/EIA/J-STD-036 E2 with Phase I Location Description Addition, Intrado Informed Response; Apr. 2004; Issue 1.11; pp. 1-57.

(Continued)

*Primary Examiner* — Hosuk Song
(74) *Attorney, Agent, or Firm* — William H. Bollman

(57) ABSTRACT

A persona-notitia intellection codifier (P-NIC) server intelligently codifies and disburses personal user information from a user device (smartphone, laptop, etc.) to a multiplicity of designee devices. Masking Persona-Notitia Intellection Codes (a.k.a. PICs) are created that each stipulate control(s) and parametric limitation(s) for the associated one of a variety of personal user information. The Persona-Notitia Intellection Codifier (P-NIC) server rapidly produces a mask comprising a multiple bit "key" value (i.e., a persona-notitia intellection code (PIC)) that is uniquely distinguishable from every other PIC that's ever been generated for a given user. The value of the PIC is typically many bytes in length, and associates attributes to a unique key value that describes a desired subset of all the user's available personal user information to be unlocked by the key value (i.e., by the PIC).

15 Claims, 4 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Scheffer |
| 4,910,767 A | 3/1990 | Brugliera et al. |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,344 A * | 1/1995 | Larsson et al. .............. 380/251 |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,457,746 A * | 10/1995 | Dolphin .................... 705/51 |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,568,551 A * | 10/1996 | Kawashima .................... 705/53 |
| 5,574,648 A | 11/1996 | Pilley |
| 5,579,372 A | 11/1996 | Åström |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,611,050 A | 3/1997 | Theimer et al. |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo et al. |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,930,701 A | 7/1999 | Skog |
| 5,943,399 A | 8/1999 | Bannister et al. |
| 5,945,944 A | 8/1999 | Krasner |
| 5,946,629 A | 8/1999 | Sawyer et al. |
| 5,946,630 A | 8/1999 | Willars et al. |
| 5,950,130 A | 9/1999 | Coursey |
| 5,950,137 A | 9/1999 | Kim |

(56) References Cited

U.S. PATENT DOCUMENTS

| | | |
|---|---|---|
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,338 A | 5/2000 | Kobayakawa et al. |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski |
| 6,101,378 A | 8/2000 | Barabash |
| 6,104,931 A | 8/2000 | Havinis et al. |
| 6,108,533 A | 8/2000 | Brohoff |
| 6,121,923 A | 9/2000 | King |
| 6,122,503 A | 9/2000 | Daly |
| 6,122,520 A | 9/2000 | Want |
| 6,124,810 A | 9/2000 | Segal |
| 6,131,028 A | 10/2000 | Whitington |
| 6,131,067 A | 10/2000 | Girerd |
| 6,133,874 A | 10/2000 | Krasner |
| 6,134,316 A | 10/2000 | Kallioniemi et al. |
| 6,134,483 A | 10/2000 | Vayanos |
| 6,138,003 A | 10/2000 | Kingdon et al. |
| 6,148,197 A | 11/2000 | Bridges |
| 6,148,198 A | 11/2000 | Anderson |
| 6,148,342 A * | 11/2000 | Ho ................................. 709/225 |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alanara |
| 6,189,098 B1 | 2/2001 | Kaliski, Jr. |
| 6,195,555 B1 | 2/2001 | Dent |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson et al. |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari et al. |
| 6,289,373 B1 | 9/2001 | Dezonno |
| 6,297,768 B1 | 10/2001 | Allen, Jr. |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch et al. |
| 6,321,257 B1 | 11/2001 | Kotola |
| 6,324,524 B1 | 11/2001 | Lent |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis et al. |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,397,074 B1 | 5/2002 | Pihl et al. |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor et al. |
| 6,429,808 B1 | 8/2002 | King et al. |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchinson |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko et al. |
| 6,556,832 B1 | 4/2003 | Soliman |
| 6,560,456 B1 | 5/2003 | Lohtia et al. |
| 6,560,461 B1 | 5/2003 | Fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam et al. |
| 6,594,500 B2 | 7/2003 | Bender |
| 6,597,311 B2 | 7/2003 | Sheynblat |
| 6,600,927 B2 | 7/2003 | Hamilton et al. |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |

(56) References Cited

U.S. PATENT DOCUMENTS

| | | |
|---|---|---|
| 6,611,757 B2 | 8/2003 | Brodie |
| 6,618,593 B1 | 9/2003 | Drutman et al. |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,675,017 B1 | 1/2004 | Enzmann et al. |
| 6,677,894 B2 | 1/2004 | Sheynblat |
| 6,680,694 B1 | 1/2004 | Knockeart |
| 6,680,695 B2 | 1/2004 | Turetzky et al. |
| 6,687,504 B1 | 2/2004 | Raith |
| 6,690,940 B1 | 2/2004 | Brown |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,396 B2 | 4/2004 | Chin et al. |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan et al. |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg et al. |
| 6,756,938 B2 | 6/2004 | Zhao et al. |
| 6,757,544 B2 | 6/2004 | Rangarajan et al. |
| 6,757,545 B2 | 6/2004 | Nowak et al. |
| 6,771,742 B2 | 8/2004 | Mathis et al. |
| 6,771,971 B2 | 8/2004 | Smith |
| 6,772,340 B1 | 8/2004 | Peinado et al. |
| 6,775,255 B1 | 8/2004 | Roy |
| 6,775,267 B1 | 8/2004 | Kung et al. |
| 6,775,534 B2 | 8/2004 | Lindgren et al. |
| 6,775,655 B1 | 8/2004 | Peinado et al. |
| 6,775,802 B2 | 8/2004 | Gaal |
| 6,778,136 B2 | 8/2004 | Gronemeyer |
| 6,778,885 B2 | 8/2004 | Agashe et al. |
| 6,781,963 B2 | 8/2004 | Crockett et al. |
| 6,788,249 B1 | 9/2004 | Farmer et al. |
| 6,795,444 B1 | 9/2004 | Vo |
| 6,795,699 B1 | 9/2004 | McCraw et al. |
| 6,799,049 B1 | 9/2004 | Zellner et al. |
| 6,799,050 B1 | 9/2004 | Krasner |
| 6,801,159 B2 | 10/2004 | Swope et al. |
| 6,804,524 B1 | 10/2004 | Vandermeijden |
| 6,807,534 B1 | 10/2004 | Erickson |
| 6,810,323 B1 | 10/2004 | Bullock et al. |
| 6,813,264 B2 | 11/2004 | Vassilovski |
| 6,813,499 B2 | 11/2004 | McDonnell et al. |
| 6,813,560 B2 | 11/2004 | Van Diggelen et al. |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Kronström et al. |
| 6,816,734 B2 | 11/2004 | Wong et al. |
| 6,820,269 B2 | 11/2004 | Baucke et al. |
| 6,829,475 B1 | 12/2004 | Lee et al. |
| 6,832,373 B2 | 12/2004 | O'Neill |
| 6,839,020 B2 | 1/2005 | Geier et al. |
| 6,839,021 B2 | 1/2005 | Sheynblat et al. |
| 6,839,417 B2 | 1/2005 | Weisman et al. |
| 6,842,715 B1 | 1/2005 | Gaal |
| 6,847,618 B2 | 1/2005 | Laursen et al. |
| 6,847,822 B1 | 1/2005 | Dennison et al. |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,733 B2 | 3/2005 | Sandhu et al. |
| 6,867,734 B2 | 3/2005 | Voor et al. |
| 6,873,854 B2 | 3/2005 | Crockett et al. |
| 6,876,734 B1 | 4/2005 | Summers et al. |
| 6,882,850 B2 | 4/2005 | McConnell et al. |
| 6,885,874 B2 | 4/2005 | Grube et al. |
| 6,885,940 B2 | 4/2005 | Brodie et al. |
| 6,888,497 B2 | 5/2005 | King et al. |
| 6,888,932 B2 | 5/2005 | Snip et al. |
| 6,895,238 B2 | 5/2005 | Newell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,230 B1 | 6/2005 | Salkini et al. |
| 6,912,395 B2 | 6/2005 | Benes et al. |
| 6,912,545 B1 | 6/2005 | Lundy et al. |
| 6,915,208 B2 | 7/2005 | Garin et al. |
| 6,917,331 B2 | 7/2005 | Gronemeyer |
| 6,930,634 B2 | 8/2005 | Peng et al. |
| 6,937,187 B2 | 8/2005 | Van Diggelen et al. |
| 6,937,872 B2 | 8/2005 | Krasner |
| 6,940,826 B1 | 9/2005 | Simard et al. |
| 6,940,950 B2 | 9/2005 | Dickinson et al. |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti et al. |
| 6,968,044 B2 | 11/2005 | Beason et al. |
| 6,970,917 B1 | 11/2005 | Kushwaha et al. |
| 6,973,320 B2 | 12/2005 | Brown et al. |
| 6,975,266 B2 | 12/2005 | Abraham et al. |
| 6,978,453 B2 | 12/2005 | Rao et al. |
| 6,980,816 B2 | 12/2005 | Rohles et al. |
| 6,985,747 B2 | 1/2006 | Chithambaram |
| 6,993,355 B1 | 1/2006 | Pershan |
| 6,996,720 B1 | 2/2006 | DeMello et al. |
| 6,999,782 B2 | 2/2006 | Shaughnessy et al. |
| 7,024,321 B1 | 4/2006 | Deninger et al. |
| 7,024,393 B1 | 4/2006 | Peinado et al. |
| 7,047,411 B1 | 5/2006 | DeMello et al. |
| 7,065,351 B2 | 6/2006 | Carter et al. |
| 7,065,507 B2 | 6/2006 | Mohammed et al. |
| 7,072,667 B2 | 7/2006 | Olrik et al. |
| 7,079,857 B2 | 7/2006 | Maggenti et al. |
| 7,103,018 B1 | 9/2006 | Hansen et al. |
| 7,103,574 B1 | 9/2006 | Peinado et al. |
| 7,106,717 B2 | 9/2006 | Rousseau et al. |
| 7,110,773 B1 | 9/2006 | Wallace et al. |
| 7,123,874 B1 | 10/2006 | Brennan |
| 7,136,466 B1 | 11/2006 | Gao |
| 7,136,838 B1 | 11/2006 | Peinado et al. |
| 7,145,900 B2 | 12/2006 | Nix et al. |

(56) References Cited

U.S. PATENT DOCUMENTS

| | | |
|---|---|---|
| 7,151,946 B2 | 12/2006 | Maggenti et al. |
| 7,174,153 B2 | 2/2007 | Ehlers |
| 7,177,397 B2 | 2/2007 | McCalmont et al. |
| 7,177,398 B2 | 2/2007 | Meer et al. |
| 7,177,399 B2 | 2/2007 | Dawson et al. |
| 7,185,161 B2 * | 2/2007 | Kang ........................... 711/164 |
| 7,200,380 B2 | 4/2007 | Havlark |
| 7,209,758 B1 | 4/2007 | Moll et al. |
| 7,209,969 B2 | 4/2007 | Lahti et al. |
| 7,218,940 B2 | 5/2007 | Niemenmaa et al. |
| 7,221,959 B2 | 5/2007 | Lindqvist et al. |
| 7,245,900 B1 | 7/2007 | Lamb et al. |
| 7,246,187 B1 | 7/2007 | Ezra et al. |
| 7,260,186 B2 | 8/2007 | Zhu et al. |
| 7,260,384 B2 | 8/2007 | Bales et al. |
| 7,277,938 B2 | 10/2007 | Duimovich et al. |
| 7,302,582 B2 | 11/2007 | Snapp et al. |
| 7,321,773 B2 | 1/2008 | Hines et al. |
| 7,330,899 B2 | 2/2008 | Wong |
| 7,333,480 B1 | 2/2008 | Clarke et al. |
| 7,369,508 B2 | 5/2008 | Parantainen |
| 7,369,530 B2 | 5/2008 | Keagy |
| 7,382,773 B2 | 6/2008 | Schoeneberger et al. |
| 7,392,240 B2 | 6/2008 | Scriffignano et al. |
| 7,394,896 B2 | 7/2008 | Norton |
| 7,428,571 B2 | 9/2008 | Ichimura |
| 7,436,785 B1 | 10/2008 | McMullen et al. |
| 7,440,442 B2 | 10/2008 | Grabelsky et al. |
| 7,444,342 B1 | 10/2008 | Hall |
| 7,450,951 B2 | 11/2008 | Vimpari |
| 7,471,236 B1 | 12/2008 | Pitt et al. |
| 7,522,182 B2 | 4/2009 | Bang |
| 7,573,982 B2 | 8/2009 | Breen et al. |
| 7,602,886 B1 | 10/2009 | Beech et al. |
| 7,623,447 B1 | 11/2009 | Faccin et al. |
| 7,711,094 B1 | 5/2010 | Olshansky et al. |
| 7,764,961 B2 | 7/2010 | Zhu et al. |
| 7,783,297 B2 | 8/2010 | Ishii |
| 7,787,611 B1 | 8/2010 | Kotelly et al. |
| 7,822,391 B1 | 10/2010 | Delker et al. |
| 7,822,871 B2 | 10/2010 | Stolorz et al. |
| 7,825,780 B2 | 11/2010 | Pitt |
| 7,881,233 B2 | 2/2011 | Bieselin |
| 7,890,122 B2 | 2/2011 | Walsh |
| 7,937,067 B2 | 5/2011 | Maier et al. |
| 7,957,751 B2 | 6/2011 | Cone |
| 8,165,603 B2 | 4/2012 | Cone |
| 8,200,291 B2 | 6/2012 | Steinmetz |
| 8,428,619 B2 | 4/2013 | Cone |
| 8,688,087 B2 | 4/2014 | Pitt et al. |
| 2001/0011247 A1 | 8/2001 | O'Flaherty et al. |
| 2001/0040886 A1 | 11/2001 | Jimenez |
| 2001/0049274 A1 | 12/2001 | Degraeve |
| 2002/0002036 A1 | 1/2002 | Uehara et al. |
| 2002/0037735 A1 | 3/2002 | Maggenti et al. |
| 2002/0052214 A1 | 5/2002 | Maggenti et al. |
| 2002/0061760 A1 | 5/2002 | Maggenti et al. |
| 2002/0069079 A1 | 6/2002 | Vega |
| 2002/0069529 A1 | 6/2002 | Wieres |
| 2002/0077083 A1 | 6/2002 | Zellner et al. |
| 2002/0077084 A1 | 6/2002 | Zellner et al. |
| 2002/0077118 A1 | 6/2002 | Zellner et al. |
| 2002/0077897 A1 | 6/2002 | Zellner et al. |
| 2002/0085538 A1 | 7/2002 | Leung |
| 2002/0086676 A1 | 7/2002 | Hendrey et al. |
| 2002/0098832 A1 | 7/2002 | Fleischer et al. |
| 2002/0102996 A1 | 8/2002 | Jenkins |
| 2002/0102999 A1 | 8/2002 | Maggenti et al. |
| 2002/0111172 A1 | 8/2002 | DeWolf et al. |
| 2002/0112047 A1 | 8/2002 | Kushwaha et al. |
| 2002/0118650 A1 | 8/2002 | Jagadeesan et al. |
| 2002/0123327 A1 | 9/2002 | Vataja |
| 2002/0126656 A1 | 9/2002 | Park |
| 2002/0138650 A1 | 9/2002 | Yamamoto et al. |
| 2002/0147023 A1 | 10/2002 | Sawada et al. |
| 2002/0156732 A1 | 10/2002 | Odijk et al. |
| 2002/0158777 A1 | 10/2002 | Flick |
| 2002/0164998 A1 | 11/2002 | Younis |
| 2002/0173317 A1 | 11/2002 | Nykanen et al. |
| 2002/0174073 A1 | 11/2002 | Nordman et al. |
| 2002/0191595 A1 | 12/2002 | Mar et al. |
| 2003/0009277 A1 | 1/2003 | Fan et al. |
| 2003/0009602 A1 | 1/2003 | Jacobs et al. |
| 2003/0012148 A1 | 1/2003 | Peters |
| 2003/0013449 A1 | 1/2003 | Hose et al. |
| 2003/0016804 A1 | 1/2003 | Sheha et al. |
| 2003/0026245 A1 | 2/2003 | Ejzak |
| 2003/0037163 A1 | 2/2003 | Kitada et al. |
| 2003/0040272 A1 | 2/2003 | Lelievre et al. |
| 2003/0044654 A1 | 3/2003 | Holt |
| 2003/0063730 A1 | 4/2003 | Woodring |
| 2003/0065788 A1 | 4/2003 | Salomaki |
| 2003/0072318 A1 | 4/2003 | Lam et al. |
| 2003/0078064 A1 | 4/2003 | Chan |
| 2003/0081557 A1 | 5/2003 | Mettala et al. |
| 2003/0086422 A1 | 5/2003 | Klinker et al. |
| 2003/0086539 A1 | 5/2003 | McCalmont et al. |
| 2003/0100320 A1 | 5/2003 | Ranjan |
| 2003/0101329 A1 | 5/2003 | Lahti et al. |
| 2003/0101341 A1 | 5/2003 | Kettler, III et al. |
| 2003/0103484 A1 | 6/2003 | Oommen et al. |
| 2003/0108176 A1 | 6/2003 | Kung et al. |
| 2003/0109245 A1 | 6/2003 | McCalmont et al. |
| 2003/0114157 A1 | 6/2003 | Spitz et al. |
| 2003/0118160 A1 | 6/2003 | Holt |
| 2003/0119521 A1 | 6/2003 | Tipnis et al. |
| 2003/0119528 A1 | 6/2003 | Pew et al. |
| 2003/0125042 A1 | 7/2003 | Olrik. et al. |
| 2003/0137961 A1 | 7/2003 | Tsirtsis et al. |
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0161298 A1 | 8/2003 | Bergman et al. |
| 2003/0163483 A1 | 8/2003 | Zingher et al. |
| 2003/0169881 A1 | 9/2003 | Niedermeyer |
| 2003/0186709 A1 | 10/2003 | Rhodes et al. |
| 2003/0187803 A1 | 10/2003 | Pitt |
| 2003/0196105 A1 | 10/2003 | Fineberg |
| 2003/0204640 A1 | 10/2003 | Sahinoja et al. |
| 2003/0223381 A1 | 12/2003 | Schroderus |
| 2004/0002326 A1 | 1/2004 | Maher |
| 2004/0004761 A1 | 1/2004 | Travis |
| 2004/0032485 A1 | 2/2004 | Stephens, Jr. |
| 2004/0043775 A1 | 3/2004 | Kennedy et al. |
| 2004/0044623 A1 | 3/2004 | Wake et al. |
| 2004/0047461 A1 | 3/2004 | Weisman et al. |
| 2004/0068724 A1 | 4/2004 | Gardner, III et al. |
| 2004/0070515 A1 | 4/2004 | Burkley et al. |
| 2004/0077359 A1 | 4/2004 | Bernas |
| 2004/0078694 A1 | 4/2004 | Lester et al. |
| 2004/0092250 A1 | 5/2004 | Valloppillil |
| 2004/0098497 A1 | 5/2004 | Banet et al. |
| 2004/0107143 A1 | 6/2004 | Niemi |
| 2004/0132465 A1 | 7/2004 | Mattila et al. |
| 2004/0150518 A1 | 8/2004 | Phillips et al. |
| 2004/0152493 A1 | 8/2004 | Phillips et al. |
| 2004/0181689 A1 | 9/2004 | Kiyoto et al. |
| 2004/0184584 A1 | 9/2004 | McCalmont et al. |
| 2004/0185875 A1 | 9/2004 | Diacakis et al. |
| 2004/0190497 A1 | 9/2004 | Knox |
| 2004/0198332 A1 | 10/2004 | Lundsgaard |
| 2004/0198386 A1 | 10/2004 | Dupray |
| 2004/0203876 A1 | 10/2004 | Drawert et al. |
| 2004/0203922 A1 | 10/2004 | Hines et al. |
| 2004/0205151 A1 | 10/2004 | Sprigg et al. |
| 2004/0209594 A1 | 10/2004 | Naboulsi |
| 2004/0229632 A1 | 11/2004 | Flynn et al. |
| 2004/0235493 A1 | 11/2004 | Ekerborn |
| 2004/0242238 A1 | 12/2004 | Wang et al. |
| 2004/0267445 A1 | 12/2004 | De Luca |
| 2005/0003797 A1 | 1/2005 | Baldwin |
| 2005/0028034 A1 | 2/2005 | Gantman et al. |
| 2005/0030977 A1 | 2/2005 | Casey et al. |

(56) References Cited

U.S. PATENT DOCUMENTS

| | | |
|---|---|---|
| 2005/0039178 A1 | 2/2005 | Marolia et al. |
| 2005/0041578 A1 | 2/2005 | Huotari et al. |
| 2005/0043037 A1 | 2/2005 | Ioppe et al. |
| 2005/0053209 A1 | 3/2005 | D'Evelyn et al. |
| 2005/0071251 A1 | 3/2005 | Linden |
| 2005/0071671 A1 | 3/2005 | Karaoguz |
| 2005/0074107 A1 | 4/2005 | Renner |
| 2005/0083911 A1 | 4/2005 | Grabelsky et al. |
| 2005/0086467 A1 | 4/2005 | Asokan et al. |
| 2005/0090236 A1 | 4/2005 | Schwinke et al. |
| 2005/0107673 A1 | 5/2005 | Ball |
| 2005/0112030 A1 | 5/2005 | Gaus |
| 2005/0119012 A1 | 6/2005 | Merheb et al. |
| 2005/0125376 A1 | 6/2005 | Curtis et al. |
| 2005/0134504 A1 | 6/2005 | Harwood et al. |
| 2005/0135569 A1 | 6/2005 | Dickinson et al. |
| 2005/0136885 A1 | 6/2005 | Kaltsukis |
| 2005/0148346 A1 | 7/2005 | Maloney et al. |
| 2005/0149430 A1 | 7/2005 | Williams |
| 2005/0169248 A1 | 8/2005 | Truesdale et al. |
| 2005/0174991 A1 | 8/2005 | Keagy |
| 2005/0186937 A1 | 8/2005 | Graham |
| 2005/0190892 A1 | 9/2005 | Dawson et al. |
| 2005/0192822 A1 | 9/2005 | Hartenstein |
| 2005/0201358 A1 | 9/2005 | Nelson |
| 2005/0201529 A1 | 9/2005 | Nelson et al. |
| 2005/0209995 A1 | 9/2005 | Aksu et al. |
| 2005/0213716 A1 | 9/2005 | Zhu et al. |
| 2005/0215233 A1 | 9/2005 | Perera et al. |
| 2005/0216300 A1 | 9/2005 | Appelman |
| 2005/0232252 A1 | 10/2005 | Hoover |
| 2005/0238156 A1 | 10/2005 | Turner |
| 2005/0250516 A1 | 11/2005 | Shim |
| 2005/0259675 A1 | 11/2005 | Tuohino et al. |
| 2005/0265318 A1 | 12/2005 | Khartabil et al. |
| 2005/0271029 A1 | 12/2005 | Iffland |
| 2005/0282518 A1 | 12/2005 | D'Evelyn et al. |
| 2005/0287979 A1 | 12/2005 | Rollender |
| 2005/0289097 A1 | 12/2005 | Trossen et al. |
| 2006/0008065 A1 | 1/2006 | Longman et al. |
| 2006/0010200 A1 | 1/2006 | Mousseau |
| 2006/0020424 A1 | 1/2006 | Quindel |
| 2006/0023747 A1 | 2/2006 | Koren et al. |
| 2006/0026288 A1 | 2/2006 | Acharya et al. |
| 2006/0036680 A1 | 2/2006 | Shim |
| 2006/0053225 A1 | 3/2006 | Poikselka et al. |
| 2006/0058042 A1 | 3/2006 | Shim |
| 2006/0058045 A1 | 3/2006 | Nilsen |
| 2006/0058102 A1 | 3/2006 | Nguyen et al. |
| 2006/0068753 A1 | 3/2006 | Karpen et al. |
| 2006/0079249 A1 | 4/2006 | Shim |
| 2006/0104306 A1 | 5/2006 | Adamczyk et al. |
| 2006/0106774 A1 | 5/2006 | Cohen |
| 2006/0120517 A1 | 6/2006 | Moon et al. |
| 2006/0128395 A1 | 6/2006 | Muhonen |
| 2006/0135177 A1 | 6/2006 | Winterbottom et al. |
| 2006/0188083 A1 | 8/2006 | Breen et al. |
| 2006/0193447 A1 | 8/2006 | Schwartz |
| 2006/0206610 A1 | 9/2006 | Ling |
| 2006/0212558 A1 | 9/2006 | Sahinoja et al. |
| 2006/0212562 A1 | 9/2006 | Kushwaha et al. |
| 2006/0225090 A1 | 10/2006 | Shim et al. |
| 2006/0234639 A1 | 10/2006 | Kushwaha et al. |
| 2006/0234698 A1 | 10/2006 | Fok et al. |
| 2006/0239205 A1 | 10/2006 | Warren et al. |
| 2006/0258380 A1 | 11/2006 | Liebowitz et al. |
| 2006/0293024 A1 | 12/2006 | Benco et al. |
| 2006/0293066 A1 | 12/2006 | Edge et al. |
| 2007/0003024 A1 | 1/2007 | Olivier et al. |
| 2007/0019614 A1 | 1/2007 | Hoffmann |
| 2007/0022011 A1 | 1/2007 | Altberg et al. |
| 2007/0026854 A1 | 2/2007 | Nath et al. |
| 2007/0026871 A1 | 2/2007 | Wager |
| 2007/0027997 A1 | 2/2007 | Polk |
| 2007/0030539 A1 | 2/2007 | Nath et al. |
| 2007/0036139 A1 | 2/2007 | Patel et al. |
| 2007/0037585 A1 | 2/2007 | Shim |
| 2007/0041513 A1 | 2/2007 | Gende |
| 2007/0049288 A1 | 3/2007 | Lamprecht et al. |
| 2007/0060097 A1 | 3/2007 | Edge et al. |
| 2007/0072624 A1 | 3/2007 | Niemenmaa et al. |
| 2007/0081635 A1 | 4/2007 | Croak et al. |
| 2007/0082681 A1 | 4/2007 | Kim et al. |
| 2007/0082682 A1 | 4/2007 | Kim et al. |
| 2007/0115941 A1 | 5/2007 | Patel et al. |
| 2007/0121601 A1 | 5/2007 | Kikinis et al. |
| 2007/0149213 A1 | 6/2007 | Lamba et al. |
| 2007/0160036 A1 | 7/2007 | Smith |
| 2007/0162228 A1 | 7/2007 | Mitchell |
| 2007/0167177 A1 | 7/2007 | Kraufvelin |
| 2007/0182547 A1 | 8/2007 | Wachter et al. |
| 2007/0182631 A1 | 8/2007 | Berlinsky et al. |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0263610 A1 | 11/2007 | Mitchell |
| 2007/0263611 A1 | 11/2007 | Mitchell |
| 2007/0270164 A1 | 11/2007 | Maier |
| 2008/0032703 A1 | 2/2008 | Krumm et al. |
| 2008/0037715 A1 | 2/2008 | Prozeniuk et al. |
| 2008/0063153 A1 | 3/2008 | Krivorot et al. |
| 2008/0065775 A1 | 3/2008 | Polk |
| 2008/0109650 A1 | 5/2008 | Shim et al. |
| 2008/0117859 A1 | 5/2008 | Shahidi |
| 2008/0160953 A1 | 7/2008 | Mia et al. |
| 2008/0186164 A1 | 8/2008 | Emigh et al. |
| 2008/0192731 A1 | 8/2008 | Dickinson |
| 2008/0208671 A1 | 8/2008 | Ehrlich et al. |
| 2008/0214202 A1 | 9/2008 | Toomey |
| 2008/0268769 A1 | 10/2008 | Brown |
| 2009/0029675 A1 | 1/2009 | Steinmetz |
| 2009/0198733 A1 | 8/2009 | Gounares et al. |
| 2009/0204600 A1 | 8/2009 | Kalik et al. |
| 2009/0237210 A1 | 9/2009 | Ciesla et al. |
| 2010/0010860 A1 | 1/2010 | Bose et al. |
| 2010/0021013 A1 | 1/2010 | Gale et al. |
| 2010/0138400 A1 | 6/2010 | Curtis et al. |
| 2010/0161662 A1 | 6/2010 | Jonas et al. |
| 2010/0167691 A1 | 7/2010 | Howarter |
| 2010/0198933 A1 | 8/2010 | Smith et al. |
| 2010/0233991 A1 | 9/2010 | Crawford et al. |
| 2010/0241507 A1 | 9/2010 | Quinn et al. |
| 2010/0262668 A1 | 10/2010 | Piett et al. |
| 2009/0020447 A1 | 5/2011 | Hirschfeld |
| 2011/0109468 A1 | 5/2011 | Hirschfeld |
| 2011/0113060 A1 | 5/2011 | Martini et al. |
| 2011/0137549 A1 | 6/2011 | Gupta et al. |
| 2011/0151837 A1 | 6/2011 | Winbush, Iii |
| 2011/0207429 A1 | 8/2011 | Maier et al. |
| 2012/0079600 A1 | 3/2012 | Kellerman |
| 2012/0157136 A1 | 6/2012 | Pitt et al. |
| 2013/0079152 A1 | 3/2013 | Hall |

FOREIGN PATENT DOCUMENTS

| | | |
|---|---|---|
| WO | WO00/40038 | 7/2000 |
| WO | WO01/45342 | 6/2001 |
| WO | WO02/057869 | 7/2002 |
| WO | WO2004/025941 | 3/2004 |
| WO | WO2005/051033 | 6/2005 |
| WO | WO2007/025227 | 3/2007 |
| WO | WO2007/027166 | 3/2007 |
| WO | WO2009/105603 | 8/2009 |

OTHER PUBLICATIONS

International Search Report in PCT/US2007/23243 dated Apr. 2, 2008.
PCT International Search Report (PCTUS2007/23714) and Written Opinion of International Searching Authority, Apr. 18, 2008.
Le-Pond Chin, Jyh-Hong Wen, Ting-Way Liu, The Study of the Interconnection of GSM Mobile Communication System Over IP

(56) References Cited

OTHER PUBLICATIONS based Network, May 6, 2001, IEEE, Vehicular Technology Conference, vol. 3, pp. 2219-2223.
Location Based Services V2 Roaming Support (non proprietary), 80-V8470-2NP A, dated Jan. 27, 2005, pp. 1-56.
Yilin Zhao, Efficient and reliable date transmission for cellular and GPS based mayday systems, Nov. 1997, IEEE, IEEE Conference on Intelligent Transportation System, 1997, ITSC 97, 555-559.
Qualcomm CDMA Technologies, LBS Control Plane/User Plane Overview—80-VD378-1NP B, 2006, pp. 1-36.
Bhalla et al, TELUS, Technology Strategy—LBS Roaming Summit, Sep. 19, 2006.
Alfredo Aguirre, Ilusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Qualcomm CDMA Technologies, MS Resident User Plane LBS Roaming—80-VC718-1 E 2006, pp. 1-37.
Intrado MSAG Prep for E911 Program and Documentation Intrado Inc., Longmont, CO Sep. 14, 2006. Accessed: Nov. 8, 2011. Idaho PSAP Standards Committee. Idaho Emergency Communications Commission,http://idahodispatch.com/index.php?option=com_document&task=doc_download&gid=3<emid=7.
International Search Report received in PCT/US2012/00266 dated Aug. 3, 3012.
International Search Report received in PCT/US2011/001990 dated Apr. 24, 2012.
International Search Report received in PCT/US2012/066313 dated Feb. 4, 2013.
International Search Report received in PCT/US2012/067857 dated Feb. 20, 2013.
International Search Report received in PCT/US2012/67689 dated Feb. 22, 2013.

* cited by examiner

PERSONA-NOTITIA INTELLECTION CODIFIER

The present application claims priority from U.S. Provisional No. 61/696,982, entitled "High Fidelity SMS Coverage Using Peer-to-Peer Text Relay", filed Sep. 5, 2012; from "U.S. Provisional No. 61/696,986, entitled "Hybrid Cell-Site-Sector Broadcast with Point-to-Point SMS CMAS Within Edge Polygons", filed Sep. 5, 2012; from U.S. Provisional No. 61/696,993, entitled "Ubiquitous Point-to-Point SMS CMAS Using Passive Location Determination", filed Sep. 5, 2012; and from U.S. Provisional No. 61/868,311, filed Aug. 21, 2013 entitled "Persona-Notitia Intellection Codifier, the entirety of all of which are expressly incorporated herein by reference.

BACKGROUND OF THE INVENTION

1. Field of the Invention

This invention relates generally to any form of information exchange. The invention is specifically intended to allow persons to easily and strictly control how information pertaining to themselves is disseminated—and to whom information pertaining to themselves is disseminated. If the dissemination of information can be limited to only those individuals or groups that have been expressly authorized to receive that information then the potential for uncontrolled and unwanted dissemination is reduced.

2. Background of Related Art

Personal Location Codes are known, e.g., co-owned U.S. Pat. No. 7,957,751; U.S. Pat. No. 8,428,619; and U.S. Pat. No. 8,165,603 describe and a personal location code (PLC) that authenticates provision of the location of a requested device. U.S. Pat. Nos. 7,957,751; 8,428,619; and 8,165,603 are expressly incorporated herein by reference.

Such known methods to codify location information dissemination control provides a 'mapping' layer between devices allowed access to the device location information, and the location information itself.

SUMMARY OF THE INVENTION

In accordance with the principles of the present invention, a method of isolating a nature of personal user information from unauthorized devices comprises receiving a PIC code uniquely associated with a given user for which personal user information is requested, the PIC code not including any indication as to a nature of what personal user information is associated therewith. The PIC code is decrypted into association with particular personal user information requested for the given user. The particular personal user information is provided to a requesting device from which the PIC code is received.

In accordance with another aspect of the present invention, a method of isolating the nature of personal user information from unauthorized devices comprises obtaining personal user information relating to a given user. A PIC code is encrypted into a mapped association with the obtained personal user information relating to the given user, the PIC code not including any indication as to a nature of what personal user information is associated therewith. The personal user information is provided only to a requesting device that provides the encrypted PIC code.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
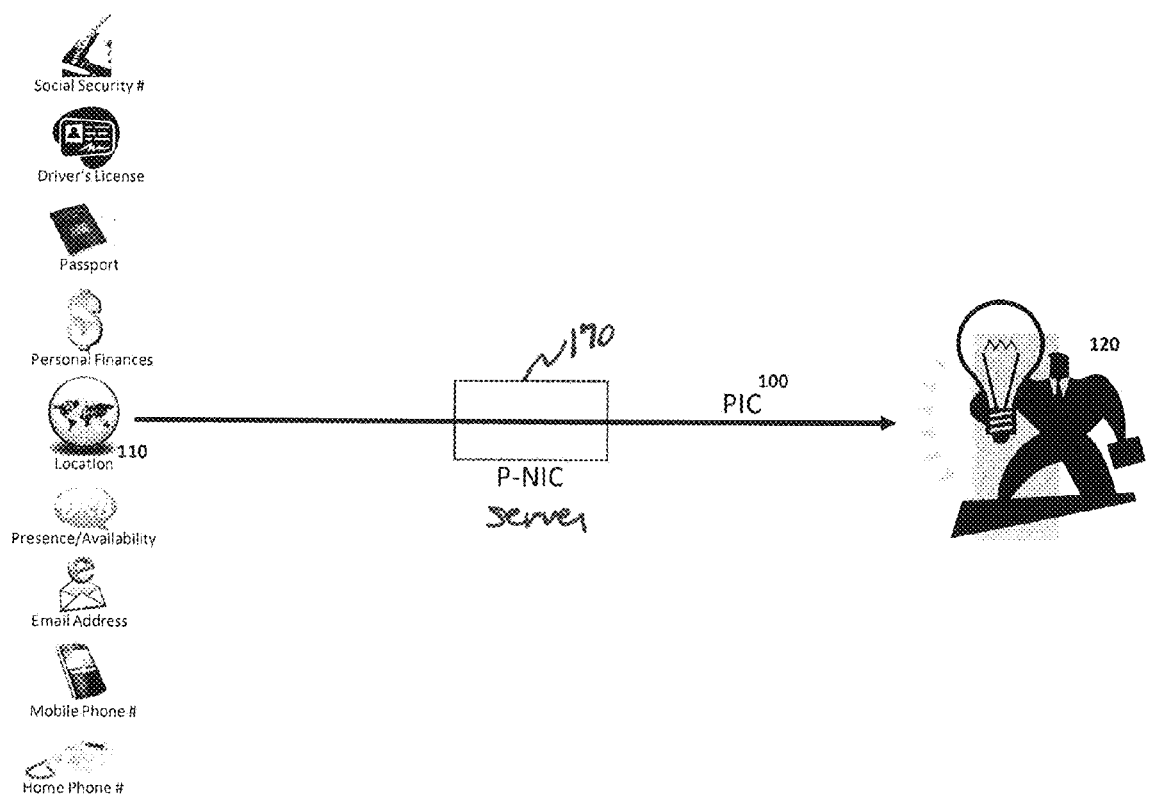
FIG. 1 shows an embodiment of a persona-notitia intellection codifier (P-NIC) server 170 wherein one PIC 100 associated with only one element of the user's personal user information 110 may be given to one and only one designee device 120.

The present invention provides additional protection of sensitive personal user information obtained from, and provided by, personal devices such as a smartphone, laptop, etc., particularly as our technological society advances and hackers start to steal user's personal user information. Conventional user devices protected user information with the now-common practice of changing passwords regularly to avert hackers able to break through password protected barriers. But this still left the identification of personal user information vulnerable to a hacker able to get past the password input.

The present invention provides user information dissemination control by inserting an ability to mask or obscure the identity of personal user information. The mask itself intentionally provides no information relating to what information it is obscuring. Thus, for instance, the location of a user's child might be identified with a seemingly random character string, e.g., "22529". In this way it becomes much more difficult for a non-authorized person to determine what personal user information is indicated by "22529", rather than a more conventional identification of the personal user information as "My son's location."

The mask in accordance with the principles of the present invention is referred to herein as a "persona-notitia intellection codifier".

Persona Notitia . . . (pĕn•sōn•ă nō•tē•sē•ă) latin phrase meaning "Personal user information".

Intellection . . . act of applying intelligence

Codifier . . . method or mechanism for systematizing via reduction to a code.

The invention provides a persona-notitia intellection codifier (P-NIC) server to intelligently codify and disburse a multiplicity of elements of personal user information from a user device (such as a smartphone, laptop, etc.) to a multiplicity of designee devices (e.g., other smartphones, laptops, a network server, a tablet computer, etc.)

The present inventors have appreciated that in a world increasingly dominated by digital media and personal device "connectivity" options, there is a growing need for users of connected devices such as smartphones, laptops, tablets, etc., to be able to manage not just what kind of personal user information said individual is sharing via their user device (e.g., smartphone, laptop, tablet, etc.) but with what other devices that personal user information is shared, what limitations on the personal user information must be enacted before the personal user information is shared with other user devices or servers, and ultimately how the other person's user device accessing the personal user information is using the personal user information.

This invention describes a method and mechanism to create and manage masking Persona-Notitia Intellection Codes (a.k.a. PICs), each of which can be stipulated to provide control(s) and parametric limitation(s) for a variety of personal user information. Exemplary personal user information codified by a P-NIC server includes, but is not limited to:

USER IDENTITY (including but not limited to full name, birth date, birth place, social security number, driver's license number, passport, etc.);

USER's PERSONAL FINANCE (including but not limited to bank account number(s), credit card number(s), etc.);

A LEVEL OF ACCURACY OF DEVICE LOCATION;

DEVICE PRESENCE (i.e., availability);

DEVICE(s) ID;

USER DEVICE's PHONE NUMBER(s);

USER DEVICE's EMAIL ADDRESSES;

USER DEVICE's INSTANT MESSENGER ADDRESS(ES);

USER SOCIAL NETWORKING IDENTITIES (including but not limited to FaceBook™, MySpace™, Twitter™, etc.);

USER VEHICLES;

USER MAILING ADDRESS(es);

USER's RELATIVES;

USER's FRIENDS.

One embodiment of the present invention provides a Persona-Notitia Intellection Codifier (P-NIC) server that rapidly produces a mask comprising a multiple bit "key" value (i.e., a persona-notitia intellection code (PIC)) that is uniquely distinguishable from every other PIC that's ever been generated for a given user. In one aspect the value of this persona-notitia intellection code (PIC) is actually many bytes in length, and associates attributes to a unique key value that describes a desired subset of all the user's available personal user information to be unlocked by the key value (i.e., by the PIC).

FIG. 1 shows an embodiment of a persona-notitia intellection codifier (P-NIC) server 170 wherein one PIC 100 associated with only one element of the user's personal user information 110 may be given to one and only one designee device 120.

Figure 2:
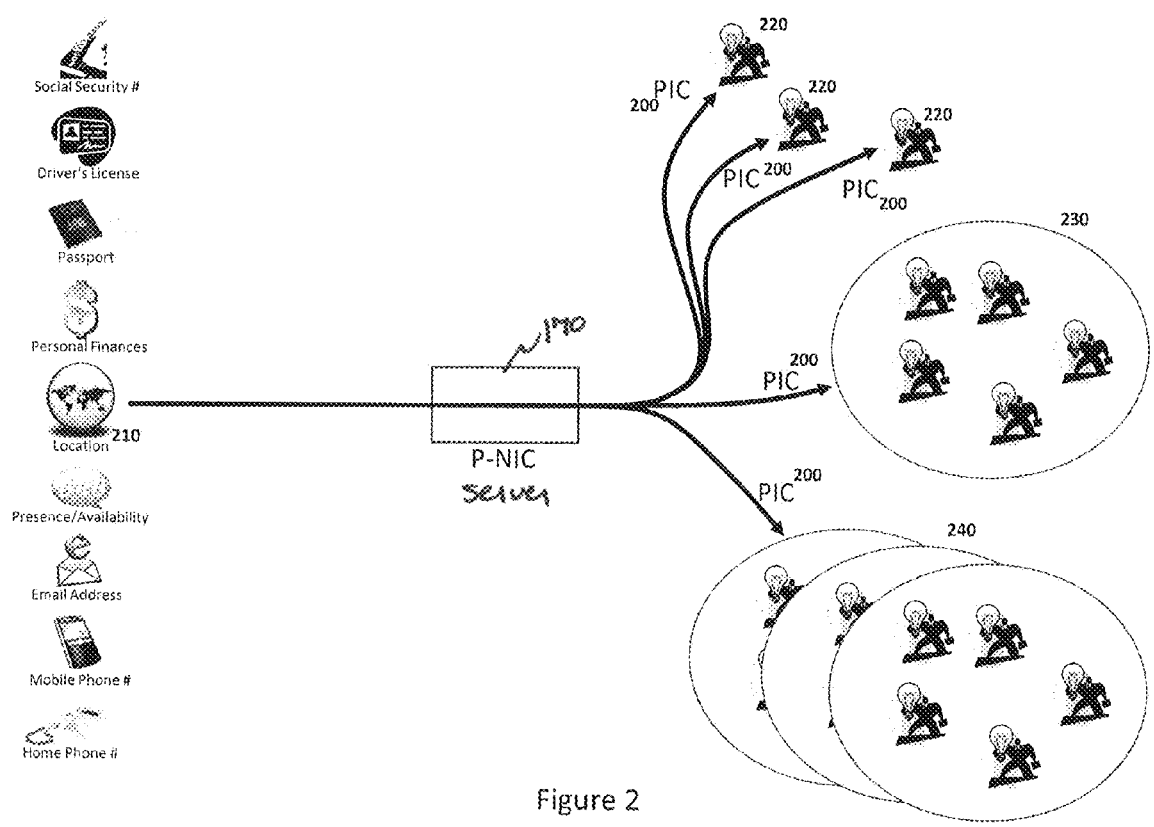
FIG. 2 shows another feature or embodiment of a persona-notitia intellection codifier (P-NIC) server 170 in accordance with the principles of the present invention wherein one PIC 200 associated with only one element of the user's personal user information 210 can be given to a multiplicity of designee devices 220, or to a group of devices that represent a multiplicity of designee devices 230, or to a multiplicity of groups each of which represents a multiplicity of designee devices 240.

FIG. 2 shows another feature or embodiment of a persona-notitia intellection codifier (P-NIC) server 170 in accordance with the principles of the present invention wherein one PIC 200 associated with only one element of the user's personal user information 210 can be given to a multiplicity of designee devices 220, or to a group of devices that represent a multiplicity of designee devices 230, or to a multiplicity of groups each of which represents a multiplicity of designee devices 240.

Figure 3:
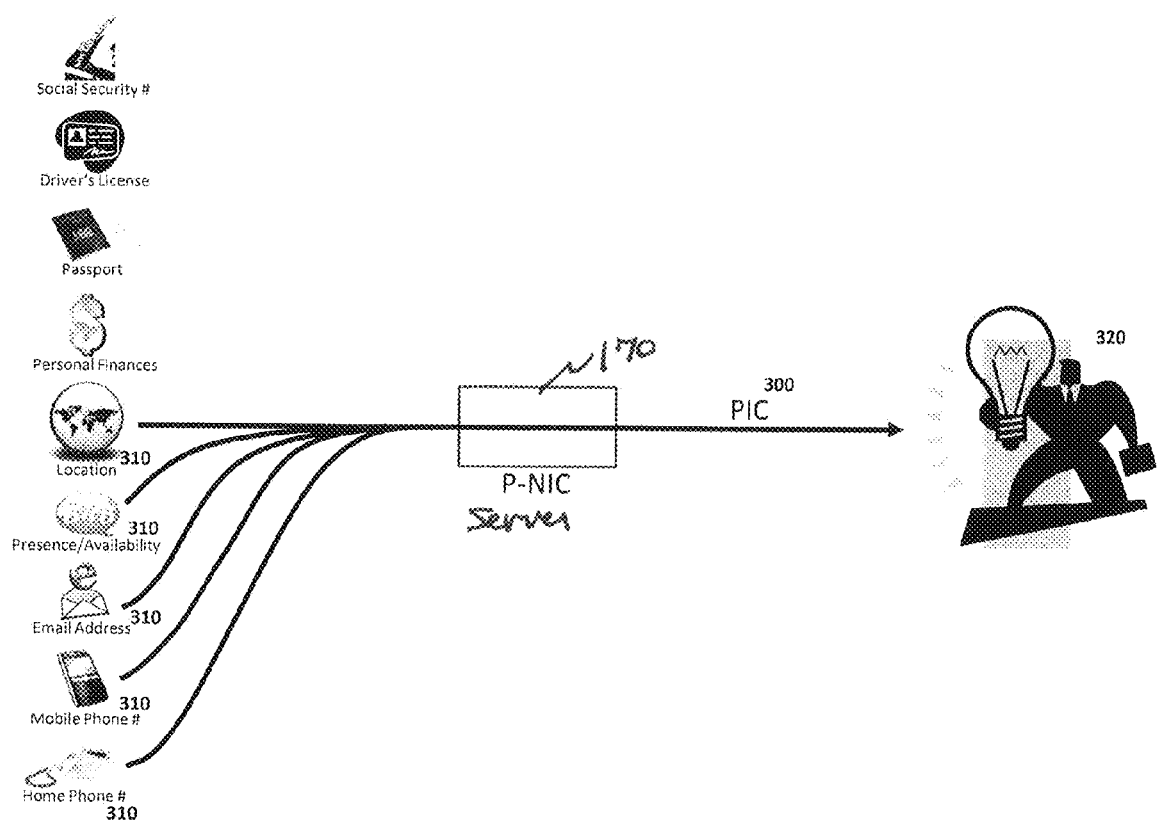
FIG. 3 shows yet another feature or embodiment of a persona-notitia intellection codifier (P-NIC) server 170 in accordance with the present invention wherein one PIC 300 associated with a multiplicity of elements of the user's personal user information 310 can be given to one and only one designee device 320.

FIG. 3 shows yet another feature or embodiment of a persona-notitia intellection codifier (P-NIC) server 170 in accordance with the present invention wherein one PIC 300 associated with a multiplicity of elements of the user's personal user information 310 can be given to one and only one designee device 320.

Figure 4:
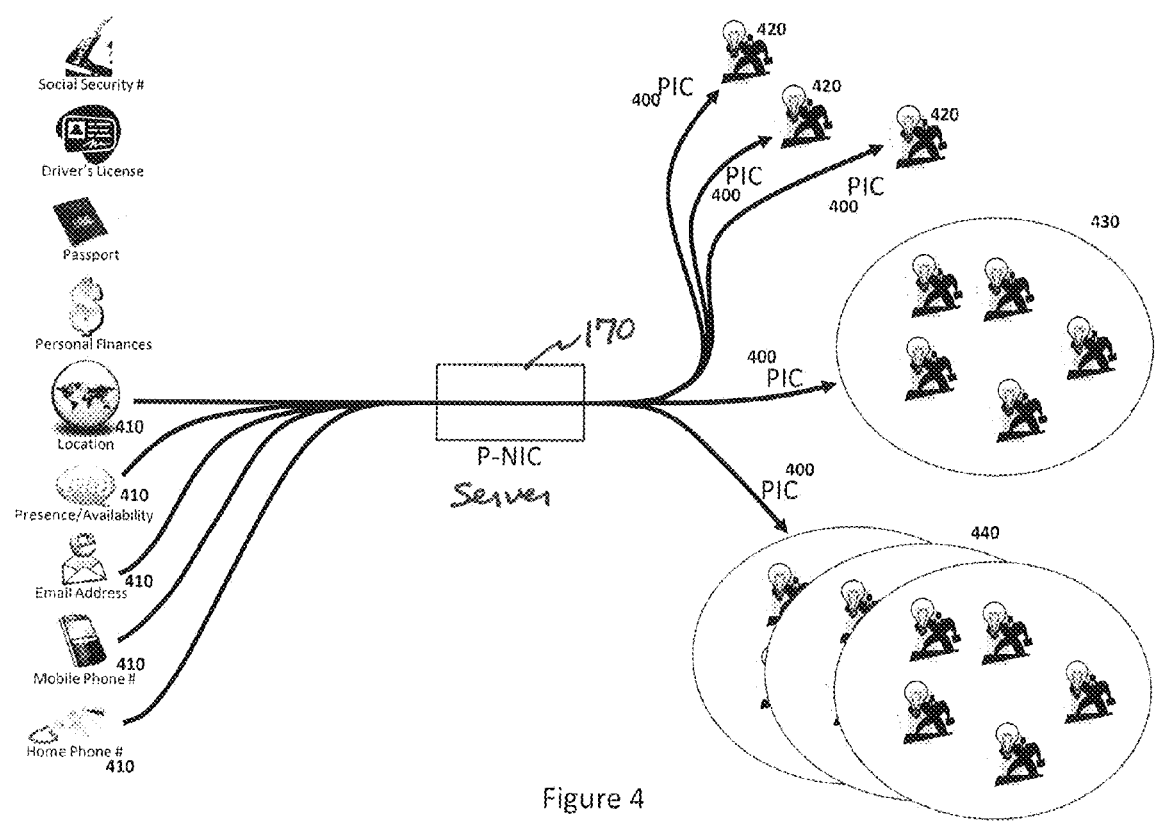
FIG. 4 shows still another feature or embodiment of a persona-notitia intellection codifier (P-NIC) server 170 in accordance with the principles of the present invention wherein one PIC 400 associated with a multiplicity of elements of the user's personal user information 410 can be given to a multiplicity of designee devices 420, or to a group that represents a multiplicity of designee devices 430, or to a multiplicity of groups each of which represents a multiplicity of designee devices 440.

FIG. 4 shows still another feature or embodiment of a persona-notitia intellection codifier (P-NIC) server 170 in accordance with the principles of the present invention wherein one PIC 400 associated with a multiplicity of elements of the user's personal user information 410 can be given to a multiplicity of designee devices 420, or to a group that represents a multiplicity of designee devices 430, or to a multiplicity of groups each of which represents a multiplicity of designee devices 440.

The creation and maintenance of a Persona-Notitia Intellection Code (PIC) 100, 200, 300, 400 in all disclosed embodiments follows a similar paradigm, regardless of how many elements of the user's personal user information are associated with a given PIC, or how many designee user devices to which the PIC is given for authorized access to the associated personal user information.

A Persona-Notitia Intellection Code (PIC) 100, 200, 300, 400 may encompass an indication of attribution within the PIC 100, 200, 300, 400 itself, but is not required to do so. Any attribute representing an element of personal user information that is identified or selected prior to the creation of the PIC 100, 200, 300, 400 may be incorporated into the PIC 100, 200, 300, 400 itself. The terms "attribute" or "attribution" are used herein to describe sub-components of an exemplary PIC 100, 200, 300, 400 that represents a predefined given element of personal user information.

The identification of an attribute may either enable access to an element of personal user information, or may disable access to an element of personal user information. This aids the ability to determine accessibility of elements of personal user information without the need to communicate with a central Persona-Notitia Intellection Codifier (P-NIC) server 170.

Each PIC 100, 200, 300, 400 is preferably coded and encrypted differently than other PICs to prevent the act of hacking one particular PIC 100, 200, 300, 400 (i.e., breaking encryption protecting the PIC 100, 200, 300, 400 to access the attributes contained within the PIC 100, 200, 300, 400) from allowing the hacker to then read all other PICs. A PIC 100, 200, 300, 400 in which no attributes are encoded need not be encrypted at all. For the purposes of this invention attribute-free PICs may either be encrypted or not encrypted. A PIC 100, 200, 300, 400 in which one or more attributes are encoded is preferably always encrypted.

The first several bytes of the PIC 100, 200, 300, 400 are preferably used to provide a map of the attributes within the PIC 100, 200, 300, 400. The multi-byte attribute map is preferably encrypted. Each attribute encoded within a PIC 100, 200, 300, 400 is preferably encoded using a key value different than all other attributes also encoded within that PIC 100, 200, 300, 400.

A PIC 100, 200, 300, 400 with a multiplicity of attributes encoded within it tends to be many bytes long. To prevent the length of a PIC 100, 200, 300, 400 from unintentionally revealing too much information, the P-NIC server 170 preferably may also use many bytes to create a PIC 100, 200, 300, 400 that contains few (or no) attributes encoded within it.

The ordering of attributes encoded within a PIC 100, 200, 300, 400 is preferably randomly generated.

After randomly ordering attributes within a PIC 100, 200, 300, 400 and then encrypting each differently, the entirety of the PIC 100, 200, 300, 400 is preferably encrypted using a key different than was used for any attribute contained within the PIC 100, 200, 300, 400. All this processing may be time consuming and result in a PIC 100, 200, 300, 400 that is rather lengthy.

For a PIC 100, 200, 300, 400 meant to be evaluated in client software (i.e., software running on a personal computer or mobile device), evaluation of the attributes of a PIC 100, 200, 300, 400 is enabled within the client without having to communicate in near real-time with the P-NIC server 170. In many applications the client software is in regular communication with the P-NIC server 170 for the purpose of receiving/updating the decryption keys it needs.

The central P-NIC server 170 may alter the current setting for the character value of any specific PIC 100, 200, 300, 400 for a given user after the character value of a given PIC 100, 200, 300, 400 is created but before the PIC 100, 200, 300, 400 reaches its expiration date. Resolution of any potential discrepancy of the PIC 100, 200, 300, 400 between its encoding, and a current P-NIC settings in the P-NIC server 170 (which may have been altered thereafter) are resolved with a simple boolean "AND" operation. For instance, if a PIC 100, 200, 300, 400 is encoded to prevent access to an element of personal user information, then no setting at the P-NIC server 170 can override that (e.g., PIC[NO] .AND. P-NIC [YES]=="NO"). However, if a PIC 100, 200, 300, 400 is encoded to allow access to an element of personal user information, then the setting at the P-NIC server 170 can override the PIC 100, 200, 300, 400 and prevent access to an element of personal user information (e.g., PIC[YES] .AND. P-NIC [NO]=="NO").

If the PIC encoding does not represent an element of personal user information in any way, then the setting at the P-NIC server 170 for that user may be used exclusively to allow or prevent access to that element of personal user information. If the PIC 100, 200, 300, 400 does not represent authorization for access to a particular element of personal user information for a given user, then access to that element of personal user information is prevented. Additionally an Error_Condition or similar may be logged by the P-NIC server 170 to indicate that an undocumented element of personal user information was queried, and the specific parameters used during the query may also be saved.

The user device or group of user devices to which the PIC 100, 200, 300, 400 is given have the opportunity to return an acknowledge message indicating receipt of the PIC 100, 200, 300, 400 after a PIC 100, 200, 300, 400 is created and given to a designee device (or to a multiplicity of designee devices, or to a group representing a multiplicity of designee devices, or to a multiplicity of groups each of which represents a multiplicity of designee devices.) An acknowledgement message (e.g., a "PIC-ACK") passed back to the P-NIC server 170 may include, but is not required to include, a short sequence of bytes representing digits or characters that constitute the PIC recipient device's "personal handshake" with the P-NIC server 170.

When provided as part of the PIC-ACK, the P-NIC server 170 preferably checks every query using that value of PIC for the personal handshake bytes. If the PIC 100, 200, 300, 400 has been sent to a multiplicity of recipient devices and a multiplicity of PIC-ACKs have been returned with personal handshake bytes, then the P-NIC server 170 preferably saves all of the personal handshake byte sequences it receives, along with whatever identification values are available, to test the veracity of incoming requests for personal user information.

Should the P-NIC server 170 receive a request for personal user information that does not have any personal handshake bytes from devices that passed personal handshake bytes back in a PIC-ACK message, then the P-NIC server 170 preferably logs a "SPOOFED QUERY" alarm message and notifies system administrators of the possible illicit use of that PIC 100, 200, 300, 400.

Should the P-NIC server 170 receive a request for personal user information that contains personal handshake bytes that are different than the personal handshake bytes saved from the PIC-ACK message, then the P-NIC server 170 preferably logs a "SPOOFED QUERY" or similar alarm message and notifies system administrators of the possible illicit use of that PIC 100, 200, 300, 400.

Should the P-NIC server 170 receive a request for personal user information that contains personal handshake bytes that match one of the current (i.e., not expired) saved handshakes, but the query and the handshake bytes are received from a device different than the one that sent the PIC-ACK message, then that fact is preferably saved and included in a report (e.g., a monthly report Emailed to an user device of the owner of the relevant personal user information.)

In yet a further embodiment of the present invention, the Persona-Notitia Intellection Codifier (P-NIC) server 170 may enable users more advanced control over the dissemination of their personal user information. For instance, relevant parametric limitations may preferably be completely controlled within the P-NIC server 170, preferably with no portion of these controls embedded within the Persona-Notitia Intellection Codes (PICs) 100, 200, 300, 400.

Exemplary parametric limitations provided by the P-NIC server may include, but are not limited to:

PIC expiration date-time (i.e. the date & time after which the PIC will no longer be accepted)
location fidelity (i.e. the accuracy that the person will for location reporting)
time parameters (i.e. parameters of HOUR, DAY, MONTH, YEAR, and DURATION)
StartTime & StopTime
StartTime & Duration
zone parameters, shapes near stationary point or points including but not limited to
Circle (point & radius)
Ellipse (point & rotationAngle & majorAxis & minorAxis)
Ellipse (FocusPointA & FocusPointB & sumOfDistanceFromFoci)
Arc (point & radius & startAngle & stopAngle)
Ring (point & innerRadius & outerRadius)
ArcBand (point & innerRadius & outerRadius & startAngle & stopAngle)
Quadrilateral (pointA & pointB & pointC & pointD)
Polygon (collection of N points defining the boundary of an area)
proximity parameters, shapes near non-stationary target (typically a mobile device hereafter referred to as Cynosure) including but not limited to
Circle (Cynosure & radius)
Ellipse (Cynosure & rotationAngle & majorAxis & minorAxis)
Arc (Cynosure & radius & startAngle & stopAngle)
Ring (Cynosure & innerRadius & outerRadius)
ArcBand (Cynosure & innerRadius & outerRadius & startAngle & stopAngle)

In a further exemplary embodiment of the present invention, parametric limitations may be combined to form more sophisticated limitations definitions for a setting in the P-NIC server 170 for a given user. For instance, a time parameter may be combined with a location fidelity parameter to establish a multi-faceted definition for a PIC 100, 200, 300, 400 representing and authorizing when a user device may be located with precision—or conversely when a user device's location should be reported when requested at a lesser fidelity (less accurate, e.g., only to a city level), or not reported at all.

A zone or proximity parameter can be combined with a time parameter to establish a sophisticated definition for a PIC 100, 200, 300, 400 representing where a user device's presence/availability or even personal financial information can be accessed. For instance, a time parameter(s) and a proximity parameter(s) can be combined to establish limitations on when and how close to the user's device another device must be to access any personal user information.

Alternatively, or additionally, proximity and location fidelity parameters can be combined to establish limitations that allow another device to precisely locate the relevant user device only when the other device is physically within a short distance of the relevant user device's location. Conversely, the combination can be used to establish limitations that another device to precisely locate the user device only when the other user device is far away (e.g., greater than a predetermined linear distance) from the relevant user device.

Since each limitation or combination of limitations can be associated with anywhere from one (1) to a multiplicity of Persona-Notitia Intellection Codes (PICs) 100 200, 300, 400, it will be readily apparent that with the present invention users can achieve complete and detailed control over access to their personal user information.

As a further embodiment of the present invention, the P-NIC server 170 preferably supports remote management of both the setting for the creation of the value of PIC codes 100, 200, 300, 400, and limitation settings, so that users can manifest nearly instantaneous control over access to their personal user information via their user device or other device (e.g., a laptop computer, a smartphone, or other type of mobile device, etc.)

As yet another embodiment of the present invention, the Persona-Notitia Intellection Codifier (P-NIC) server 170 preferably keeps a record of every Persona-Notitia Intellection Code (PIC) 100, 200, 300, 400 assigned to a given user, to a given group of users, or to a given collection of groups of users, along with information pertaining to the given user, group, or collection of groups who received each character value of those PICs 100, 200, 300, 400. This information assists the owner user device in controlling access to specific subsets of the user's personal user information. It also provides the user with a means to control the fidelity (i.e., accuracy) of the information reported.

While the invention has been described with reference to the exemplary embodiments thereof, those skilled in the art will be able to make various modifications to the described embodiments of the invention without departing from the true spirit and scope of the invention.

What is claimed is:

1. A method of isolating a nature of personal user information from unauthorized devices, comprising:
    receiving a PIC code uniquely associated with a given user for which personal user information is requested, said PIC code not including any indication as to a nature of what personal user information is associated therewith;
    decrypting said PIC code into association with particular personal user information including a requested social networking identity for said given user; and
    providing said social networking identity for said given user to a requesting device from which said PIC code is received.

2. The method of isolating a nature of personal user information from unauthorized devices according to claim 1, wherein:
    said code is numerous bytes in length.

3. The method of isolating a nature of personal user information from unauthorized devices according to claim 1, wherein said isolated personal user information comprises:
    an identity of said given user.

4. The method of isolating a nature of personal user information from unauthorized devices according to claim 1, wherein said isolated personal user information comprises:
    a personal finance account number of said given user.

5. The method of isolating a nature of personal user information from unauthorized devices according to claim 1, wherein said isolated personal user information comprises:
    a presence of a given user device.

6. The method of isolating a nature of personal user information from unauthorized devices according to claim 1, wherein said isolated personal user information comprises:
    a phone number of a given user device.

7. The method of isolating a nature of personal user information from unauthorized devices according to claim 1, wherein said isolated personal user information comprises:
    an email address of a given user device.

8. The method of isolating a nature of personal user information from unauthorized devices according to claim 1, wherein said isolated personal user information comprises:
    an instant messenger address of a given user.

9. The method of isolating a nature of personal user information from unauthorized devices according to claim 1, wherein said isolated personal user information comprises:
    a mailing address of a given user.

10. A method of isolating a nature of personal user information from unauthorized devices, comprising:
    receiving a PIC code uniquely associated with a given user for which personal user information is requested, said PIC code not including any indication as to a nature of what personal user information is associated therewith;
    decrypting said PIC code into association with isolated personal user information including a level of accuracy of device location to be reported for said given user; and
    providing said particular personal user information to a requesting device from which said PIC code is received.

11. A method of isolating a nature of personal user information from unauthorized devices, comprising:
    receiving a PIC code uniquely associated with a given user for which personal user information is requested, said PIC code not including any indication as to a nature of what personal user information is associated therewith;
    decrypting said PIC code into association with isolated personal user information including an identity of a vehicle relating to a given user; and
    providing said particular personal user information to a requesting device from which said PIC code is received.

12. A method of isolating a nature of personal user information from unauthorized devices, comprising:
    receiving a PIC code uniquely associated with a given user for which personal user information is requested, said PIC code not including any indication as to a nature of what personal user information is associated therewith;
    decrypting said PIC code into association with isolated personal user information including an identity of a relative of a given user; and
    providing said particular personal user information to a requesting device from which said PIC code is received.

13. A method of isolating a nature of personal user information from unauthorized devices, comprising:
    receiving a PIC code uniquely associated with a given user for which personal user information is requested, said PIC code not including any indication as to a nature of what personal user information is associated therewith;

decrypting said PIC code into association with isolated personal user information including an identity of a friend of a given user; and providing said particular personal user information to a requesting device from which said PIC code is received.

14. A method of isolating a nature of personal user information from unauthorized devices, comprising:

obtaining personal user information including a level of accuracy of device location to be reported for relating to a given user;

encrypting a PIC code into a mapped association with said obtained personal user information relating to said given user, said PIC code not including any indication as to a nature of what personal user information is associated therewith; and providing said personal user information only to a requesting device that provides said encrypted PIC code.

15. A method of isolating the use of personal user information from unauthorized devices, comprising:

receiving a PIC code uniquely associated with a given user for which personal user information is requested, said PIC code not including any indication as to a nature of what personal user information is associated therewith;

utilizing said PIC code to identify requested particular personal user information including comparing time of request to time said information is allowed to be accessed as identified by said given user; and providing said particular personal user information to a requesting device from which said PIC code is received.

* * * * *